Oct. 6, 1931.        A. E. OSWALD        1,826,478
BRUSH FOR ELECTRIC MOTORS
Original Filed June 27, 1924
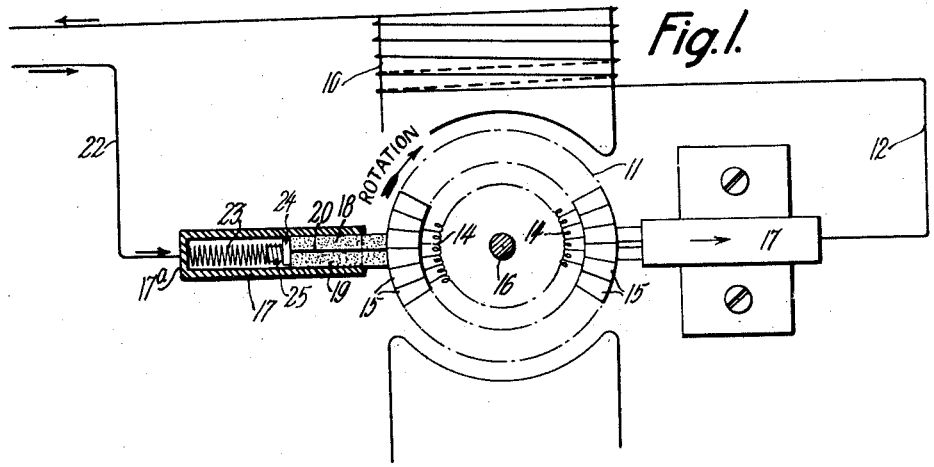
Fig. 1.
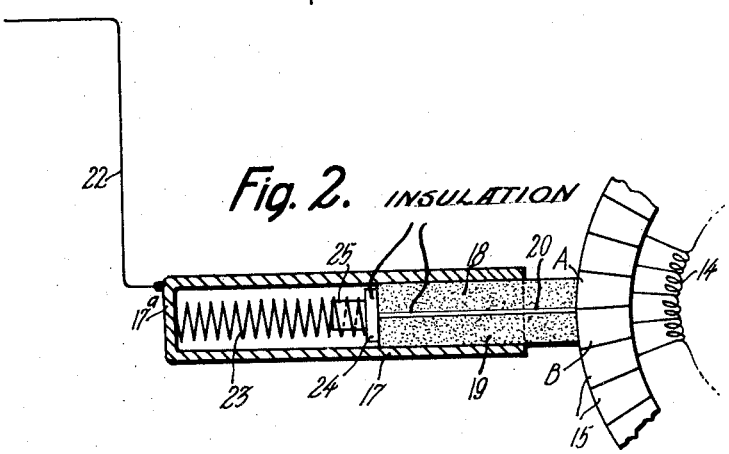
Fig. 2. INSULATION
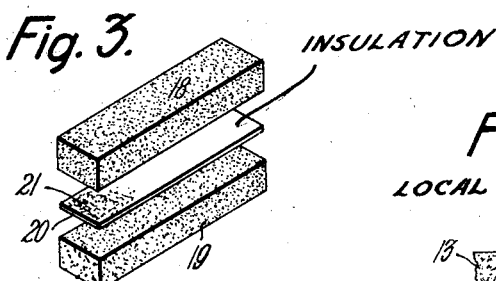
Fig. 3. INSULATION
Fig. 4.
LOCAL COMMUTATION CURRENT
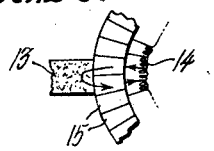
Inventor:
Alfred E Oswald
by D C Stickney
Attorney.

Patented Oct. 6, 1931

1,826,478

UNITED STATES PATENT OFFICE

ALFRED E. OSWALD, OF HACKENSACK, NEW JERSEY, ASSIGNOR TO UNDERWOOD ELLIOTT FISHER COMPANY, OF NEW YORK, N. Y., A CORPORATION OF DELAWARE

BRUSH FOR ELECTRIC MOTORS

Original application filed June 27, 1924, Serial No. 722,647. Divided and this application filed May 27, 1929. Serial No. 366,194.

This invention relates generally to the construction and mounting of brushes which contact with the commutators of dynamos and motors, particularly in alternating current circuits of commercial voltages. Certain features of the invention are also useful for direct current circuits.

The revolving commutator is usually composed of a circular row of segments insulated from one another and connected in the form of terminals to individual coils grouped about the shaft of the revolving armature. Stationary brushes usually press upon the opposite sides of the periphery of the commutator and are usually made out of blocks or sticks of carbon or other material. In an alternating motor these brushes usually occupy positions midway of the field poles. This arrangement is found in practice to give rise to local short-circuited currents. The lines of force in the alternating current field cut the individual coils which are separately connected to the segments. This effect occurs in the coils which momentarily are in contact with the brushes. Individual local currents are thus generated in such coils at the moment, these local currents being high, and having low voltage. The local current passes through the coil whose segments are momentarily in contact with a brush.

These local currents are only temporary, but they form and disappear in rapid succession, and produce heat and are therefore an objection. Moreover they consume power, which is a further objection. Again, since the contacts are constantly being made and broken as the commutator revolves, there results a constant succession of sparks, which is objectionable in all cases, and moreover tends to reduce the efficiency of the motor and impair and shorten the life of the commutator and wear away the brushes.

The end of the brush itself completes the circuit for such local current, and hence favors the generation of the same. The reason is that said brush end contacts temporarily with two or more of the segments or contacts in the commutator, thus enabling it to join said segments electrically and temporarily complete a circuit.

According to the present invention, this difficulty is minimized or practically overcome by substantially minimizing the time during which the brush itself may electrically join adjacent commutator segments as just explained. For this purpose the brush or block of carbon is split longitudinally throughout its length, and between its portions is inserted a separating layer comprising paper or other insulator. Since current cannot pass through such insulator, the end of the brush, as a whole, is substantially prevented from completing a local circuit, and the formation of local currents is disfavored or minimized.

Another feature of the invention is an improvement in the means for pressing the brush against the commutator, and this improvement is also useful in connection with the usual undivided brush. Heretofore the brush has been inserted endwise into a metal holder, cell, socket or housing, and a helically-coiled compression spring has been inserted, bearing at one end against the brush, and at the other end against the outer end or terminal of the housing. The latter is made of metal, and the spring has served as the main path for the current from the socket to the brush. It has been found that the spring, being made of resilient metal, offers obstruction to the flow of the current, and therefore becomes heated, and it also tends to receive heat from the brush itself, and from the sparking in some instances; and it has been found that the end portion of the spring which presses against the brush becomes overheated and softens and loses its efficiency and shape. This trouble often arises from the starting or overload current. To overcome this difficulty, the spring is suitably insulated from the brush, thus preventing any current from flowing through the spring into the brush, and so eliminating any danger of the spring becoming overheated.

This is a division of my application Serial No. 722,647, filed June 27, 1924 (now Patent No. 1,743,682, dated January 14, 1930).

Other features and advantages will hereinafter appear.

In the accompanying drawings,

Figure 1 is a diagram showing the present improvements in brush devices, the commutator and field of an alternating motor being indicated diagrammatically.

Figure 2 is an enlarged view of the brush shown in Figure 1, and shows more clearly the means for preventing overheating of the brush-spring.

Figure 3 shows the brush sections separated from the intervening insulator.

Figure 4 is a diagram to explain the manner in which the end of the brush temporarily completes the local circuit forming a short-circuit current in an ordinary motor.

A motor usually comprises a stationary field coil 10 and a commutator 11, the latter connected in series with a field circuit 12 by means of stationary brushes 13 (Figure 4) which press upon the commutator, the latter usually comprising individual coils 14 electrically connected to segments 15, which are built up to form the circular commutator, which revolves upon the armature shaft 16.

Each brush, which slides in a fixed metal housing 17, comprises sections 18, 19, between which is interposed a paper or other insulator 20, secured to both sections by adhesive 21, such, for example, as ordinary library paste. This built-up brush is strong, substantial and efficient. It is placed in the housing 17 in such a manner that as the two sections 18, 19 are simultaneously in contact with adjoining segments 15 in the commutator (as indicated at A and B, Figure 2), the insulator or brush-divider 20 prevents a local circuit being completed, as across the fully-divided brush-sections 18, 19, through that local coil 14, whose segments A, B are temporarily contacting with the brush. This minimizes or eliminates the local short-circuit current, with the benefits already explained.

The paper extends the full length of the carbon, and continues to serve its purpose as the end of the carbon is worn off.

For causing the paper to adhere to the carbon, there may be used ordinary library paste. Other adhesive may be used, or other insulator employed.

The thickness of each section of the brush may be nearly equal to the thickness of a commutator-segment. It is observed that even when the two halves of the brush are separated by the insulator 20, there may still be a residual fraction of time in which there is opportunity for a local circuit to be completed through one of the halves 18 or 19 of the brush; but in practice, owing to the speed of the commutator, this time is too small for the local current to form, and little or no difficulty is experienced.

The current passes into the end 17a of the housing 17 from a line-wire 22 and then passes directly from the sides of the housing 17 into the brush-sections 18, 19, which is an advantage, particularly where the brush is divided into sections.

A feature of the present invention resides in means for preventing overheating of the brush-spring, and for this purpose the end of the spring is insulated from the brush, so that no current flows through the spring, but the brush receives the entire current from direct contact with the metal housing in which it slides, said housing forming a part of the circuit.

In the present invention a single helical spring 23 is shown, which at its outer end bears against the closed end of the housing 17 and at its inner end bears against an insulating member shown in the form of a washer 24, which in turn bears against the brush-sections 18, 19. The washer 24 is provided with a projection 25 around which the end of the spring 23 is wound, thereby retaining the spring in position with respect to said washer and brush-elements. With this arrangement no current can pass through the spring into the brush, and hence the spring does not become heated and thereby impaired. When the brush wears away the motor will slow down or stop, since no current can pass through the spring into the commutator, and since the holder is out of contact with the commutator.

Variations may be resorted to within the scope of the invention, and portions of the improvements may be used without others.

Having thus described my invention, I claim:

The combination with a commutator, of a spark-preventing brush made up of sections of carbon wholly separated from each other by an insulator and contacting simultaneously with successive segments of the commutator, a holder in the form of a shell housing said brush and fitting thereto and formed of conducting material and having an end, the brush mounted to slide in said holder and said sections being in electrical contact with the sides of said holder, and a line-wire, the housing constituting the conductor between the brush and the line-wire, a spring compressed within the housing and bearing against the housing, said brush being provided with an insulation against which said spring also bears, to prevent line current from flowing through the spring, and said insulation communicating the pressure of the spring to both brush-sections.

ALFRED E. OSWALD.